Patented Aug. 7, 1928.

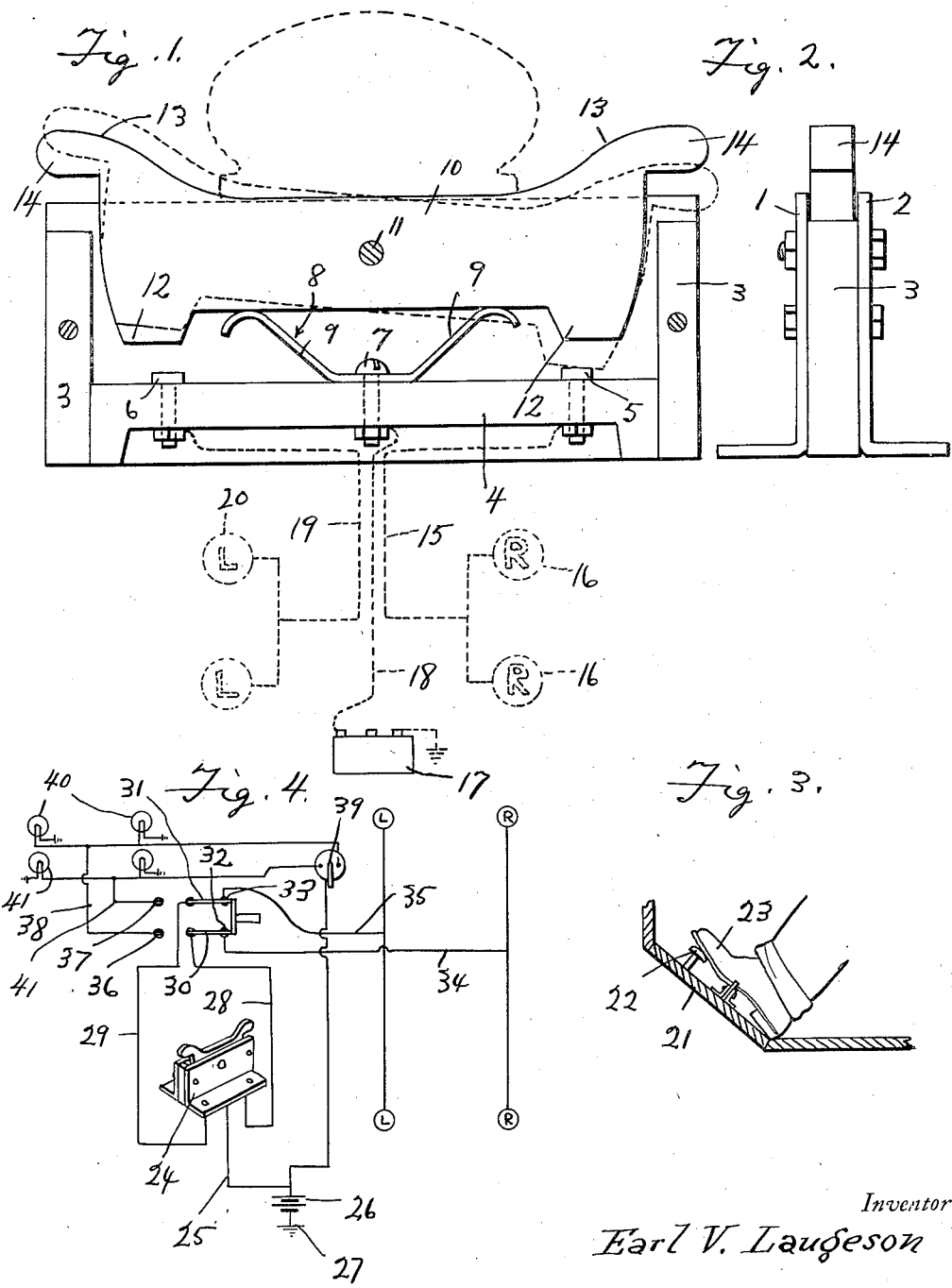

1,679,833

UNITED STATES PATENT OFFICE.

EARL VIRGIL LAUGESON, OF PORTLAND, OREGON.

CIRCUIT CLOSER FOR DIRECTION SIGNALS.

Application filed April 7, 1927. Serial No. 181,729.

This invention relates to a circuit closer and more particularly to a foot operated circuit control member for direction signals of motor vehicles.

An object of the invention resides in providing a suitable circuit closer having a rocking member adapted to be mounted on the floor board of a motor vehicle, adjacent the driver's seat so that the driver may engage the member with the foot and rock the same to the right or left for energizing either a right or left direction signal as desired.

The invention further comprehends the provision of a simple and novel combination of parts in providing a circuit closer all of which are more particularly pointed out in the following detailed description, and in the claims, directed to a preferred form of the invention, it being understood, however, that various changes in the size, shape and arrangement of the parts may be made without departing from the spirit and scope of the invention as herein set forth.

In the drawing forming part of this application:—

Figure 1 is a side elevational view of the improved circuit closer with one of the supporting plates removed to illustrate the contact and rock member carried thereby, the circuit connections to the signals being shown in dotted lines.

Fig. 2 is an end elevation of a lever structure, as shown in Fig. 1.

Fig. 3 is a view illustrating the application of the circuit closer to the floor board of a motor vehicle, for operation by the driver with his foot simultaneously with the operation of the throttle.

Fig. 4 is a wiring diagram showing the circuit connection for employing the improved circuit closer in controlling direct signals as well as the headlights of a vehicle, in order to shift the circuits in such a manner that either a direction signal can be given when desired, or the headlights made dim or bright in night driving when passing other vehicles.

1 and 2 indicate a pair of oppositely formed side cover and supporting plates, which are secured in spaced relation by the vertical end blocks 3 and a contact supporting block 4 extending along the bottom portion of the side plates between the end blocks 3. The contact supporting block 4 carries contacts 5 and 6 respectively, secured therein at the opposite end portions, while in the central portion is mounted the screw member 7 securing the contact spring 8 thereto in the central portion.

This contact spring 8 has upwardly extending resilient arms 9 engaging the underside of the rock lever 10 which is pivotally mounted on the supporting rod 11 mounted in the central upper edge portion of the sash and supporting plates 1 and 2.

The end portions of the upwardly extending arms 9 are provided with downwardly curved terminals in order that the arms will ride freely on the rock lever 10 for maintaining this rock lever in a horizontal position as shown in full lines in Fig. 1. At the opposite lower ends of the rock lever, the same is formed with projections 12 which are adapted to engage with the contacts 5 and 6 respectively, when the lever is rocked on the pivot 11 in one direction or the other, one of the positions being shown in dotted lines in Fig. 1, in which the lever thru the projection 12, closes the circuit through the contact for energizing a signal in a manner which will be described.

The upper edge of the rock lever 10 terminates in the plane of the upper edges of the supporting plates 1 and 2 throughout the central portion thereof, and at the opposite ends are provided the upwardly curved portions 13 terminating in projections 14 overlying the end blocks 3 and forming a means for limiting and operating projections on the rock lever.

As shown in Fig. 1, this rock lever is constructed in such a manner that the operating projections formed by the extensions 14 and the upwardly curved portion 13, are separated a sufficient distance, to permit of the reception of the shoe of the operator for the switch over the central portion, so that any movement of the foot in the central portion of the switch will not operate the rod levers.

As a result, the motion of the foot from the position shown in dotted lines in Fig. 1, to the right or the left, is necessary to effect the operation of the rock lever by engagement with the curved portion 13 at either end of the rock lever.

In the control of direction signals with a switch of this character, the contact member 5 at the right hand end of Fig. 1, is connected by a wire 15 to the "right" direction signals 16, the opposite terminal of said signals being grounded to the frame of the vehicle for completing a circuit to the battery 17 in the usual manner. The battery is connected with the wire 18 to the screw 7, so that the circuit is completed through the spring member 8 and the rock lever 10.

A circuit wire 19 is connected with the left contact member 6 for controlling a circuit to the "left" direction signal 20 the opposite terminals of which are also grounded to form the return circuit to the battery.

When this switch is mounted on the floor board 21 of the vehicle as shown in Fig. 3, immediately to the rear of the foot operated throttle control 22, the foot of the operator as indicated at 23, may extend across the central portion of supporting plates 1 and 2, over the rock lever 10, so that the operator of the vehicle may suitably operate the throttle control 22 in the usual operation of the vehicle, without operating the rock levers.

The supporting plates 1 and 2 will further form a support for the foot to take the place of the usual support used in conjunction with the throttle lever in order that the control thereof by the foot may be made in a gradual and even manner through the support provided by the plates 1 and 2, when it is desired to energize a direction signal through the circuits as above described, the operator of the vehicle keeping his foot on the throttle may slide the same along the plates 1 and 2 for the purpose of depressing the rock lever 10 at either end in the manner as above set forth, so that one of the projections 12 engages either the contact 5 or contact 6, depending upon the intended direction which the operator desires to drive his vehicle, and as a result of which, the desired signal will be energized.

As soon as the further necessity for the signal through completing the turn has been obviated, the operator then returns his foot to the central portion of the supports 1 and 2 and the rock lever, as a result of which it assumes the position shown in full lines in Fig. 1, and the operator continues to control his throttle in the usual manner.

This switch may also be used in night driving for the control of the headlights of the vehicle in order to shift the same from bright to dim, when passing another vehicle on the road, and for this purpose, the circuit connections as illustrated in Fig. 4, may be made for the control of the direction signals, and the headlights, in a manner as will now be described.

The switch illustrated in Fig. 1, is shown in perspective and diagrammatically at 24, Fig. 4, and has the central contact post 7 connected with the wire 25 to the opposite terminal of which is grounded in the usual maner on the vehicle, as shown at 27. The contacts 5 and 6 respectively of the switch member shown in Fig. 4, are connected by the wires 28 and 29 respectively to the pivotal and movable switch plate 31 and 30 respectively. A double throw double pole switch is illustrated in Fig. 4, having the switch plates 30 and 31, but it is to be understood that any desired type of switch construction well known in the art and suitable for the purpose may be used, in place of a double throw double pole switch.

One pair of stationary contacts are indicated at 32 and 33 respectively, and are adapted to be engaged simultaneously by the switch blades 30 and 31 respectively so as to close the circuit connections between the wires 20 and 29, and wires 34 and 35 respectively to the "right", and "left" direction signals, respectively. The circuit to these direction signals in this position of the switch, as shown in full lines in Fig. 4, is controlled in exactly the same manner as above described in connection with the circuit connections as shown in Fig. 1.

When it is desired to use the switch 24 to control the bright and dim lights on a motor vehicle, the switch is thrown to the opposite position so that the blades 31 and 32 close the circuit with stationary contacts 36 and 37 respectively.

The contact 36 is connected by the wire 38 in parallel with the usual light controlling switch 39 on the vehicle, with the circuits to the bright filaments or headlight bulbs indicated at 4. The wire 31 is connected with the stationary contact 37, and makes circuit with the filaments of bulbs 41 which form the dim headlights of the motor vehicle. As a result, the rocking of the switch lever 10 can be obtained for energizing the circuit to either the bright or the dim headlights on the motor vehicle, simultaneous with the operation of the throttle in the manner as above described in order that the operator of the vehicle may conveniently and frequently change the circuit to extinguish the bright headlights and light the dim headlights when passing other vehicles on the road.

Having thus described my invention, what I claim as new is:—

1. A circuit closer, comprising a support, a pair of contacts mounted at opposite ends of said support, a central contact member mounted in said support, and a rock lever pivotally mounted in said support and normally engaged and retained in one position by the central contact member, said lever being operable to engage either of said end contacts mounted in said support.

2. A circuit closer, comprising a pair of supporting plates, end blocks secured between the opposite ends of said plates and mounting the same in spaced parallel relation, a contact block mounted between said plates, a rock lever pivotally mounted between said plates in its central portion, a contact spring mounted on said contact blocks, and normally engaging said rock lever, adapted to retain said lever normally in one position, and a pair of contacts mounted in opposite ends of said contact blocks, adapted to be alternately engaged by said rock lever in a predetermined manner for circuit closing cooperation therewith.

In testimony whereof I affix my signature.

EARL VIRGIL LAUGESON.